United States Patent
Kappus et al.

(10) Patent No.: US 9,654,229 B2
(45) Date of Patent: May 16, 2017

(54) PARAMETRIC TRANSDUCER MICROPHONE SYSTEM

(71) Applicant: Turtle Beach Corporation, Poway, CA (US)

(72) Inventors: Brian Alan Kappus, San Diego, CA (US); Elwood Grant Norris, Poway, CA (US)

(73) Assignee: Turtle Beach Corporation, San Diego, CA (US)

( * ) Notice: Subject to any disclaimer, the term of this patent is extended or adjusted under 35 U.S.C. 154(b) by 0 days.

(21) Appl. No.: 14/618,866

(22) Filed: Feb. 10, 2015

(65) Prior Publication Data

US 2016/0233966 A1    Aug. 11, 2016

(51) Int. Cl.
*H04B 11/00*    (2006.01)

(52) U.S. Cl.
CPC ................................ *H04B 11/00* (2013.01)

(58) Field of Classification Search
CPC ...................................................... H04B 11/00
USPC ........................................................... 367/92
See application file for complete search history.

(56) References Cited

U.S. PATENT DOCUMENTS

| | | | | |
|---|---|---|---|---|
| 5,718,227 A * | 2/1998 | Witlin | ................... | A61B 8/0866 600/528 |
| 7,383,297 B1 * | 6/2008 | Atsmon | ................. | H04B 11/00 704/200.1 |
| 2002/0085451 A1 * | 7/2002 | Gerosa | ................ | G10L 21/0364 367/132 |
| 2004/0031856 A1 * | 2/2004 | Atsmon | ................... | G06F 21/34 235/492 |
| 2008/0130919 A1 * | 6/2008 | Whillock | ............... | H04B 11/00 381/111 |
| 2011/0129101 A1 * | 6/2011 | Hooley | ................... | H04R 3/005 381/92 |
| 2011/0235466 A1 * | 9/2011 | Booij | ..................... | H04B 11/00 367/135 |
| 2012/0171963 A1 * | 7/2012 | Tsfaty | .................... | H04B 11/00 455/41.3 |

(Continued)

FOREIGN PATENT DOCUMENTS

WO    WO2014/025752 A1 *  2/2013  ............... H04S 7/00

OTHER PUBLICATIONS

Herbert, Schweinzer. "Piezoceramic ultrasound transducer enabling broadband transmission for 3D scene analysis in air." Proceedings Sensor+ test Conference-Sensor. 2009.*

*Primary Examiner* — James Hulka
*Assistant Examiner* — John T Nolan
(74) *Attorney, Agent, or Firm* — Sheppard Mullin Richter & Hampton LLP

(57) ABSTRACT

An ultrasonic emitter can launch an unmodulated ultrasonic carrier signal towards an audio source. The ultrasonic carrier signal, upon being reflected from the audio source, undergoes modulation by the audio source. The modulated ultrasonic signal may then be received by an ultrasonic microphone and demodulated to retrieve the audio. A highly directional microphone system is achieved through the use of the ultrasonic emitter and ultrasonic microphone, where the modulated ultrasonic signal only arises when the audio source is in the 'beam' of the ultrasonic carrier signal and the ultrasonic microphone can ignore other potential noise, ambient sound(s), etc.

22 Claims, 12 Drawing Sheets

(56) References Cited

U.S. PATENT DOCUMENTS

| | | | |
|---|---|---|---|
| 2013/0129102 A1* | 5/2013 | Li | H04M 9/082 381/71.1 |
| 2014/0369169 A1* | 12/2014 | Iida | H04B 11/00 367/135 |
| 2015/0235645 A1* | 8/2015 | Hooks | G10L 19/008 704/500 |

* cited by examiner

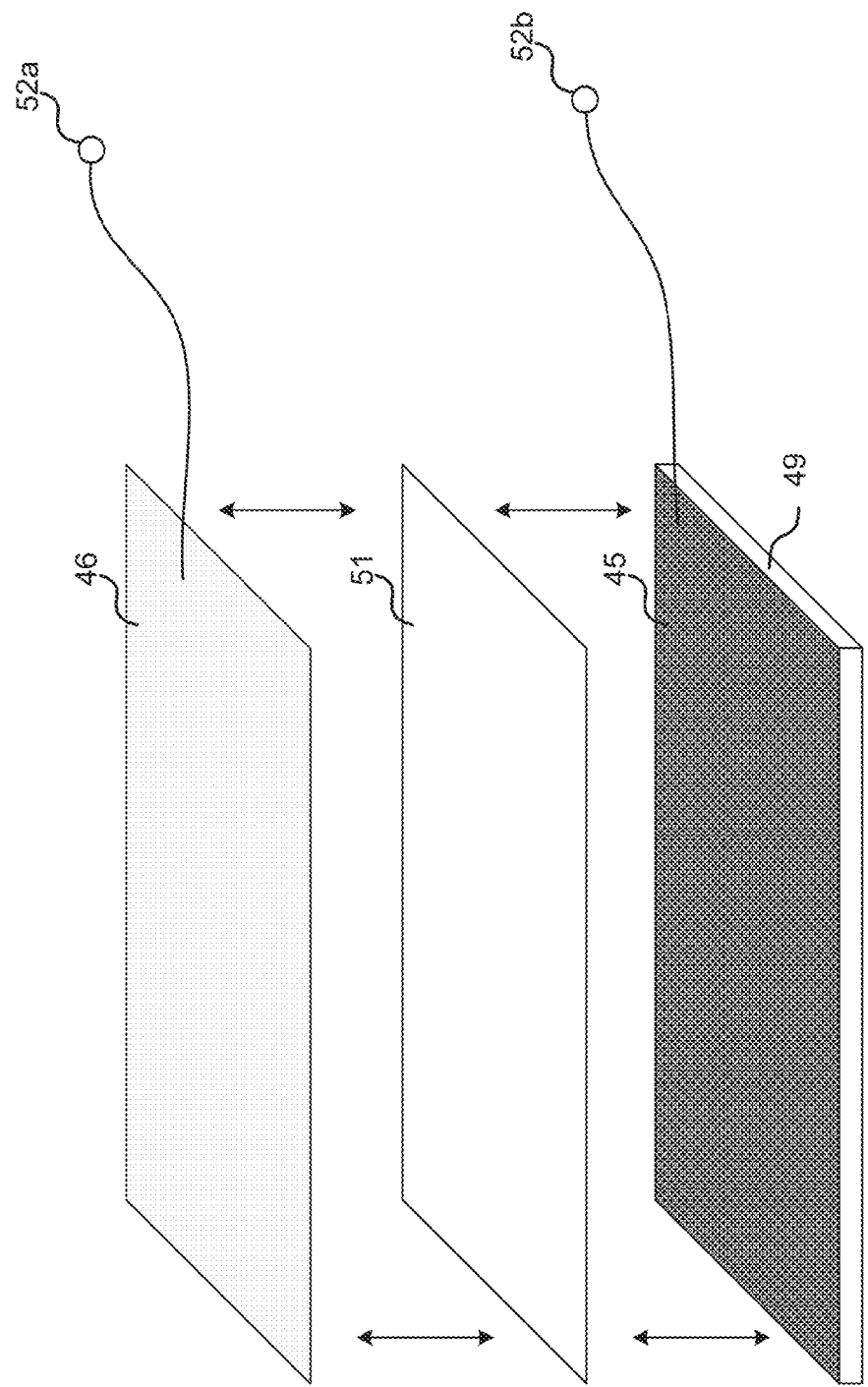

PARAMETRIC TRANSDUCER MICROPHONE SYSTEM

TECHNICAL FIELD

The present disclosure relates generally to parametric speakers for a variety of applications. More particularly, some embodiments relate to an ultrasonic emitter microphone system.

BACKGROUND OF THE INVENTION

The change in frequency of a wave (such as sound) for an observer moving relative to the source of the wave/sound is referred to as the Doppler effect or Doppler shift. Leveraging the Doppler effect, laser Doppler vibrometers can be used to make non-contact vibration measurements of a surface. In a laser Doppler vibrometer, a laser beam is directed at the surface of interest, and the vibration amplitude and frequency are extracted from the Doppler shift of the reflected laser beam frequency due to the motion of the surface.

In the context of ultrasound, the Doppler ultrasound technique relies on the use of pulsed emissions. In pulsed Doppler ultrasound, instead of emitting continuous ultrasonic waves, an emitter periodically sends a short ultrasonic burst. A receiver can continuously receive echoes from targets that may be present in the path of the ultrasonic beam. By sampling the incoming echoes at the same time relative to the emission of the bursts, the shift of positions of scatters are measured. This has various applications, e.g., for measuring the velocity of fluids such as blood. For example, an ultrasound transducer can be used to transmit ultrasound into tissue. If the ultrasound passes through a vessel with blood, the ultrasound will interact with the blood cells and a part of the ultrasound energy will be scattered back towards the transducer, where it can be detected.

Doppler ultrasound can also be accomplished using continuous ultrasonic waves at known frequencies. When incident on a moving body, the reflected waves are shifted by a frequency proportional to the velocity of the moving body. By comparing the frequencies of the reflected waves to the original ultrasonic signal, a detailed description of the motion of the moving body can be constructed. For a single frequency of emitted ultrasound, this comparison is done through frequency demodulation using the emitted frequency as the zero point. This is superior to the pulsed ultrasound technique as it provides a continuous measurement rather than a pulsed one. In this way, bandwidth is greatly increased.

SUMMARY

Embodiments of the technology described herein include an ultrasonic emitter microphone system. In accordance with one embodiment, a method comprises picking up, at an ultrasonic microphone, a frequency modulated ultrasonic signal comprising an audio signal representative of vibrations from an audio source modulated on an ultrasonic carrier signal. The method further comprises tuning a demodulator to a frequency associated with the ultrasonic carrier signal. Additionally still, the method comprises demodulating the frequency modulated ultrasonic signal based on the frequency associated with the ultrasonic carrier to retrieve the audio signal.

In accordance with another embodiment, a system comprises: an ultrasonic emitter configured to emit an ultrasonic carrier signal; an ultrasonic microphone configured to receive a reflected ultrasonic signal comprising an audio signal representative of vibrations from an audio source modulated on the ultrasonic carrier signal and output the audio signal; and a demodulator configured to demodulate the ultrasonic signal to retrieve the audio signal.

In accordance with still another embodiment, an apparatus comprises a tuner configured to tune to a frequency of an ultrasonic carrier signal. The apparatus further comprises a demodulator configured to receive, from an ultrasonic microphone, a frequency modulated ultrasonic signal comprising an audio signal representative of vibrations from an audio source modulated on the ultrasonic carrier signal, and demodulate the frequency modulated ultrasonic signal to retrieve the audio signal by removing the ultrasonic carrier signal component from the frequency modulated ultrasonic signal. Further still, the apparatus comprises an amplifier configured to amplify the audio signal.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the accompanying figures. The drawings are provided for purposes of illustration only and merely depict typical or example embodiments of the invention. These drawings are provided to facilitate the reader's understanding of the systems and methods described herein, and shall not be considered limiting of the breadth, scope, or applicability of the claimed invention.

Some of the figures included herein illustrate various embodiments of the invention from different viewing angles. Although the accompanying descriptive text may refer to elements depicted therein as being on the "top," "bottom" or "side" of an apparatus, such references are merely descriptive and do not imply or require that the invention be implemented or used in a particular spatial orientation unless explicitly stated otherwise.

FIG. 9 is a diagram illustrating yet another example configuration of ultrasonic emitter in accordance with one embodiment of the technology described herein.

The figures are not intended to be exhaustive or to limit the invention to the precise form disclosed. It should be understood that the invention can be practiced with modification and alteration, and that the invention be limited only by the claims and the equivalents thereof.

DESCRIPTION

Embodiments of the systems and methods described herein provide an ultrasonic microphone for a variety of different applications, and some embodiments relate to a directional ultrasonic microphone.

As described above, ultrasound techniques have applications in, e.g., the medical field, for measuring blood flow. However, the principles of ultrasound can be leveraged in other ways and/or the implementation thereof can be improved as will be discussed herein. That is, various embodiments are directed to the use of ultrasonic emitters in a directional ultrasonic emitter microphone system. In particular, an ultrasonic emitter can be utilized to launch an unmodulated ultrasonic carrier signal towards an audio source. The ultrasonic carrier signal, upon interacting with and being reflected from the audio source, undergoes frequency modulation (FM) by the audio source due to the motion of a reflecting/reflective boundary or skin. This FM ultrasonic signal may then be picked up by a microphone and demodulated to retrieve the audio from the audio source. The FM ultrasonic signal only arises when the audio source is in the 'beam' of the ultrasonic carrier signal. That is, and due to the highly directional nature of an ultrasonic emitter, an FM ultrasonic signal is generated only when the ultrasonic emitter is pointed toward the audio source. Likewise, the microphone, which is an ultrasonic microphone itself, is highly directional and can pick up the reflected FM ultrasonic signal, e.g., the microphone could be tuned (to the ultrasonic carrier) and therefore, ignore other sounds/noise in the environment that would, in conventional systems, require additional filtering and/or processing to remove.

Figure 1:
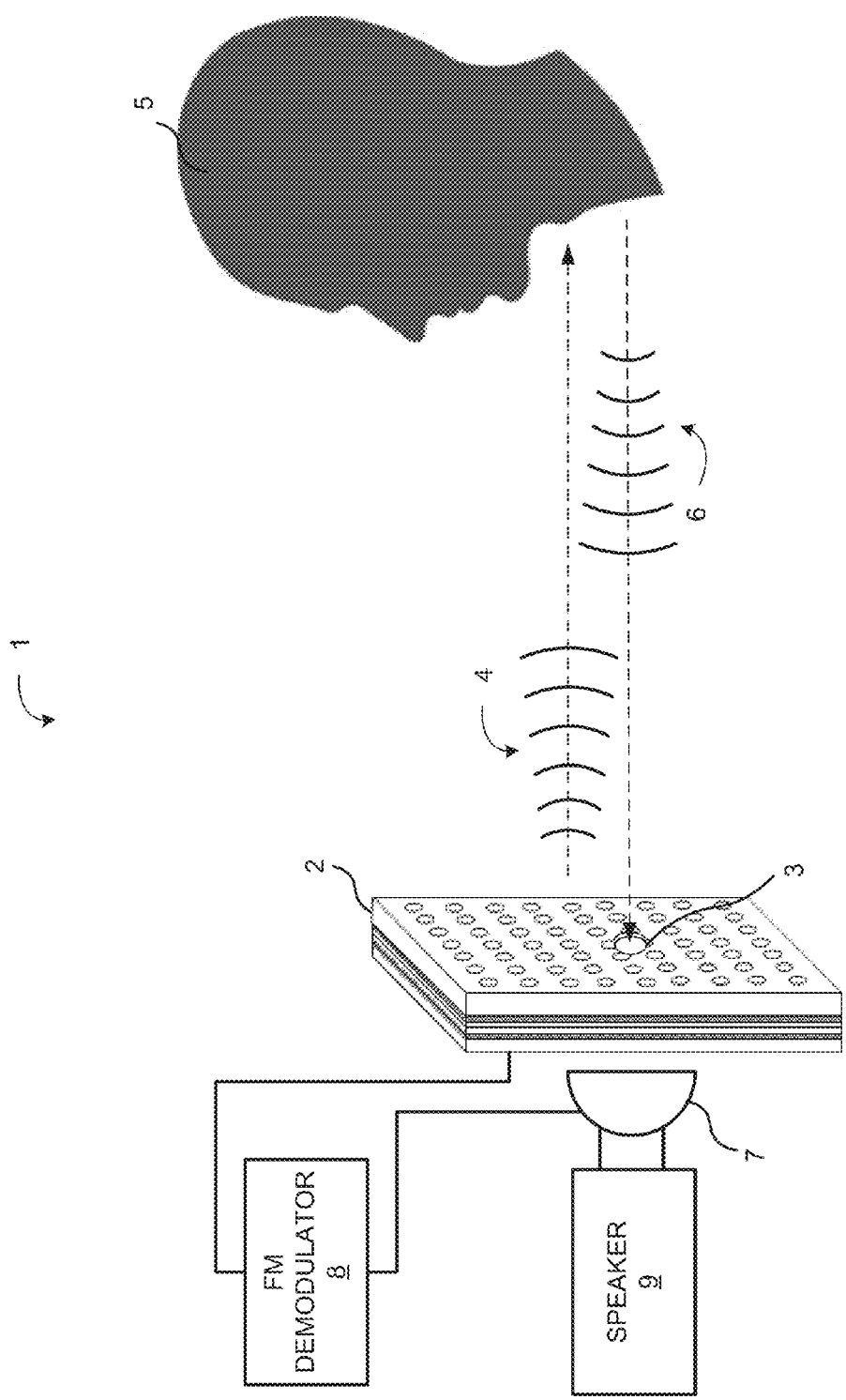
FIG. 1 is a diagram illustrating an example ultrasonic emitter microphone system in accordance with one embodiment of the technology described herein.

FIG. 1 illustrates an example ultrasonic emitter microphone system 1 in accordance with one embodiment of the technology disclosed herein. Ultrasonic emitter microphone system 1 can include an emitter 2. Emitter 2 can be an example of any of the emitters configured in accordance with various embodiments, as will be described in greater detail below, which can include multiple conductive surfaces respectively disposed on a backing plate and substrate, an insulating layer, and, e.g., a grating.

As alluded to above, emitter 2 can be configured to emit an unmodulated ultrasonic carrier signal. For example, a local oscillator or other like source (not shown) can be used to generate an ultrasonic carrier signal. In some embodiments an oscillator is driven at a selected frequency of 40 kHz to 50 kHz, this range corresponding to readily available crystals that can be used in the oscillator. The ultrasonic carrier signal may then be amplified with an amplifier (not shown). The amplifier can be part of, and in the same housing or enclosure as a driver/self-bias circuit to be described below. Alternatively, the amplifier can be separately housed. After amplification, the ultrasonic carrier signal is delivered to inputs of the driver circuit, and emitter 2 which can be connected to the driver circuit can be driven to launch ultrasonic carrier signal 4.

As illustrated in FIG. 1, the ultrasonic carrier signal 4 can be directed toward an audio source, such as a talker 5, and in particular, toward the throat/vocal cords of talker 5. Upon hitting the throat of talker 5, which is a relatively solid or 'hard' surface, reflection of the ultrasonic carrier signal occurs. It should be noted that because the reflection occurs via a solid/hard surface (relative to air), the reflection coefficient (i.e., ratio of reflected intensity and incident intensity of a sound wave) is relatively high.

Sound, such as the voice of a talker, e.g., talker 5, is generated as air comes out of the lungs, through the trachea, and into the larynx. This air makes the vocal cords vibrate, and in doing so, the vocal cords alternately trap and release the air. Each release of air into the pharynx results in a sound wave. The vibration of the vocal cords sends vibrations throughout the neck and head, reaching the skin. As the skin vibrates or moves toward emitter 2, there is a slight shift up in frequency of the reflected ultrasonic carrier signal, while movement of the skin back or away from emitter 2, results in a slight shift down in frequency of the reflected ultrasonic carrier signal. Accordingly, the reflection of the ultrasonic carrier signal is, in effect, modulated by the vibrations of the skin and vocal cords. In other words, the reflected signal is an FM ultrasonic signal 6 in which the audio signal representative of voice/sounds emanating from talker 5 is modulated onto the carrier. That is, the previously unmodulated ultrasonic carrier signal is now modulated with an audio signal. It should be noted that the vibrations from the vocal cords are a direct representation of the talker's voice, i.e., no non-linearities are present/involved as the frequency of the vibrations are the same as those of audible sounds waves.

Figure 2:
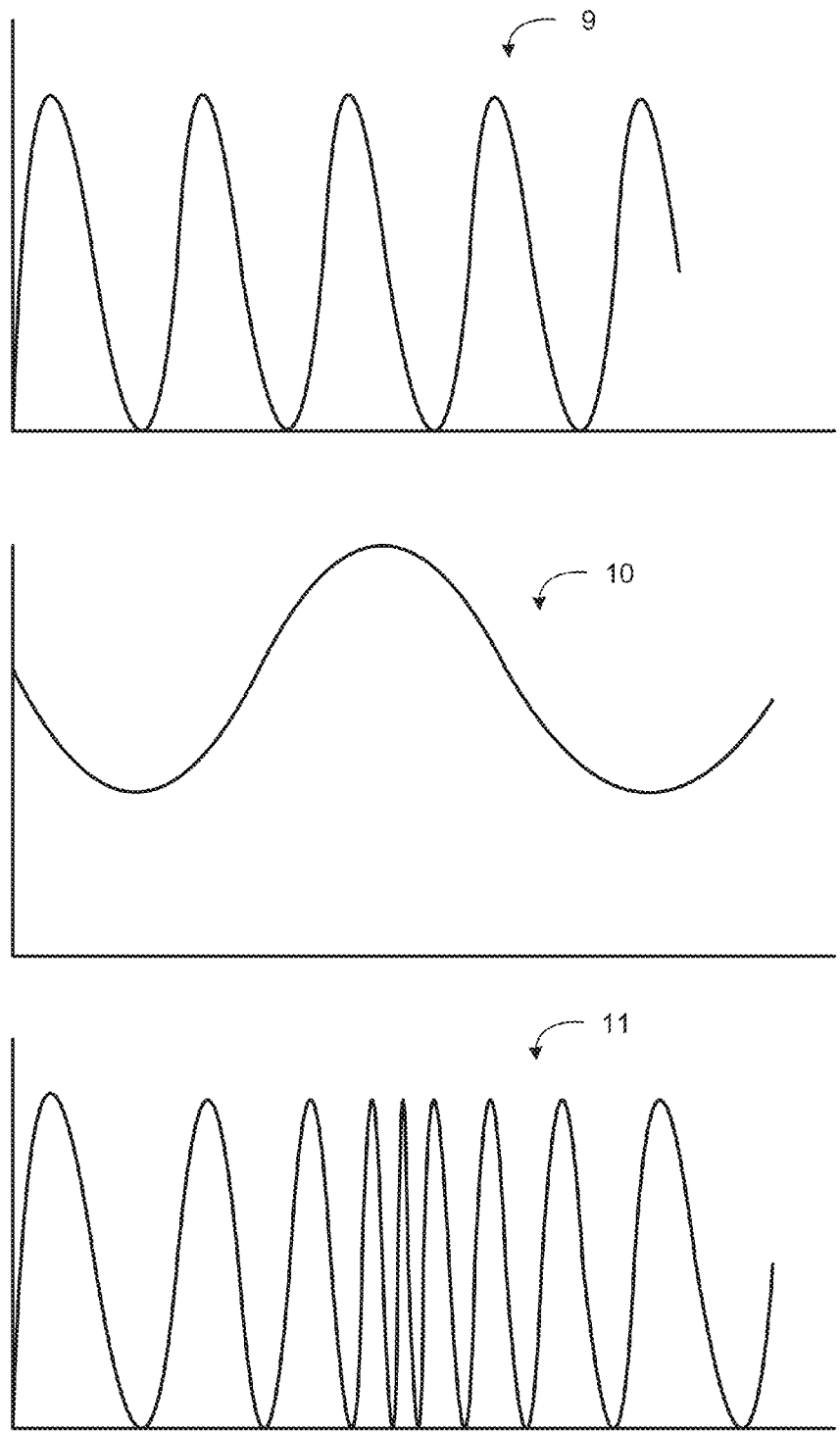
FIG. 2 is a diagram illustrating an example ultrasonic emitter microphone system in accordance with another embodiment of the technology described herein.

FIG. 2 illustrates the unmodulated ultrasonic carrier signal 9 having a particular frequency, an audio signal representative of audio/sound 10 from talker 5, and the FM ultrasonic signal 11. As can be appreciated, FM ultrasonic signal 11 shifts in frequency in line with the modulation.

Referring to FIG. 1, the (reflected) FM ultrasonic signal 6 can be picked up by a microphone 7, demodulated by an FM demodulator 8, and subsequently sent to a speaker 9 or other audio system to be output as audio and/or further processed.

A microphone such as microphone 7 may be thought of as a transducer. That is, a microphone generally converts acoustic energy or sound into electrical energy, which can then be amplified and sent to speakers, headphones, etc. Typically, a microphone operates by way of some element that vibrates in response to being struck by sound waves. When this element vibrates, these vibrations can be converted into an electrical current, which becomes an audio signal representative of the sound waves.

In accordance with one embodiment, microphone 7 is an ultrasound microphone capable of sensing sound, audio, tones, etc., having a frequency at or above about 20 kHz. For example, microphone 7 may be a piezoelectric microphone comprising a first electrode, a piezoelectric layer formed of a piezoelectric material such as polyvinylidene fluoride (PVDF), and a second electrode sequentially formed/deposited on a silicon substrate. The piezoelectric layer can generate a piezoelectric signal in proportion to an applied sound pressure, and the piezoelectric signal can be transmitted to an amplifier through the first and second electrodes.

As another example, the microphone 7 may be a broadband microphone. That is, such a broadband microphone may be configured to be sensitive to and pick up both the aforementioned FM modulated ultrasonic signal as well as 'regular' audio signals from a speaker (e.g., speaker 9), actual sound signals from talker 5, and/or another audio source(s). A processing system, such a computer or some digital signal processor can be utilized to build a resulting signal from both the FM modulated ultrasonic signal(s) as well as the regular audio signals. It should be noted that although background noise may be introduced into the ultrasonic emitter microphone system 1, having the baseband audio signal can be used to improve the quality of the measured sound (derived from the FM modulated ultrasonic signal(s).

For ease of illustration, microphone 7 is shown as being behind emitter 2, where microphone 7 can receive the FM ultrasonic signal via one or more apertures 3 within emitter 2. It should be noted, however, that microphone 7 may be embedded or recessed into emitter 2, and need not necessarily be an element of ultrasonic emitter microphone system 1 that is separate/remote from emitter 2. The same holds true for FM demodulator 8 (which will be described in greater detail below).

In accordance with another embodiment, emitter 2 itself can also be utilized as a microphone. As described above, emitter 2 may be an ultrasonic electrostatic emitter (transducer). Accordingly, operation of emitter 2 can also be used to sense ultrasonic signals by operating essentially in reverse and processing out the unmodulated carrier signal. For example, a digital signal processing and/or driver circuit operatively connected to or integrated with emitter 2 could be configured to allow emitter 2 to act as an ultrasonic receiver/microphone rather than an ultrasonic emitter (i.e., alternating between emitting an unmodulated ultrasonic carrier and listening for a reflected FM ultrasonic carrier). Alternatively, emitter 2 can be partitioned, wherein a first portion can be configured as an ultrasonic emitter while a second portion can be configured as an ultrasonic receiver/microphone. As a result, the emitted beam width of emitter 2 can also be the receptive beam width of emitter 2.

FM demodulator 8 can include any type of appropriate FM detection/demodulation functionality, but may generally include a tuner, a demodulator, and an amplifier for removing the ultrasonic carrier portion of (reflected) FM ultrasonic signal 6. In accordance with one embodiment, FM demodulator 8 can demodulate FM ultrasonic signal 6 and remove the DC offset, while in accordance with another embodiment, FM demodulation can occur after initial removal of the AC ripple component.

For example, FM demodulator 8 may be a slope FM detector, which can utilize the slope of a tuned circuit to convert the frequency variations in FM ultrasonic signal 6 into amplitude variations representative of the audio (e.g., voice) of talker 5. That is, FM demodulator 8 can include a tuned circuit that is tuned to a frequency that is slightly offset from the frequency of unmodulated ultrasonic carrier signal 4. As the frequency of FM modulated ultrasonic signal 6 varies up and down, the signal moves up and down the slope of the tuned circuit, causing the amplitude of the signal to vary in line with the variation in frequency. The amplitude modulation may then be demodulated using, e.g., a diode circuit, and thereafter amplified.

In accordance with another embodiment, FM demodulator 8 may be a phase locked loop FM demodulator. A phase locked loop may include a phase detector, a voltage controlled oscillator (VCO) and a loop filter. With the VCO tuned to the frequency of unmodulated ultrasonic carrier signal 4, the control voltage to the VCO will attempt to keep the VCO frequency locked to unmodulated ultrasonic carrier signal 4. Accordingly, the variations in voltage (which 'follows' FM ultrasonic signal 6) will be representative of the audio signal that is modulating FM modulated ultrasonic signal 6. Amplifying the voltage variations generates the demodulated audio signal.

Figure 3:
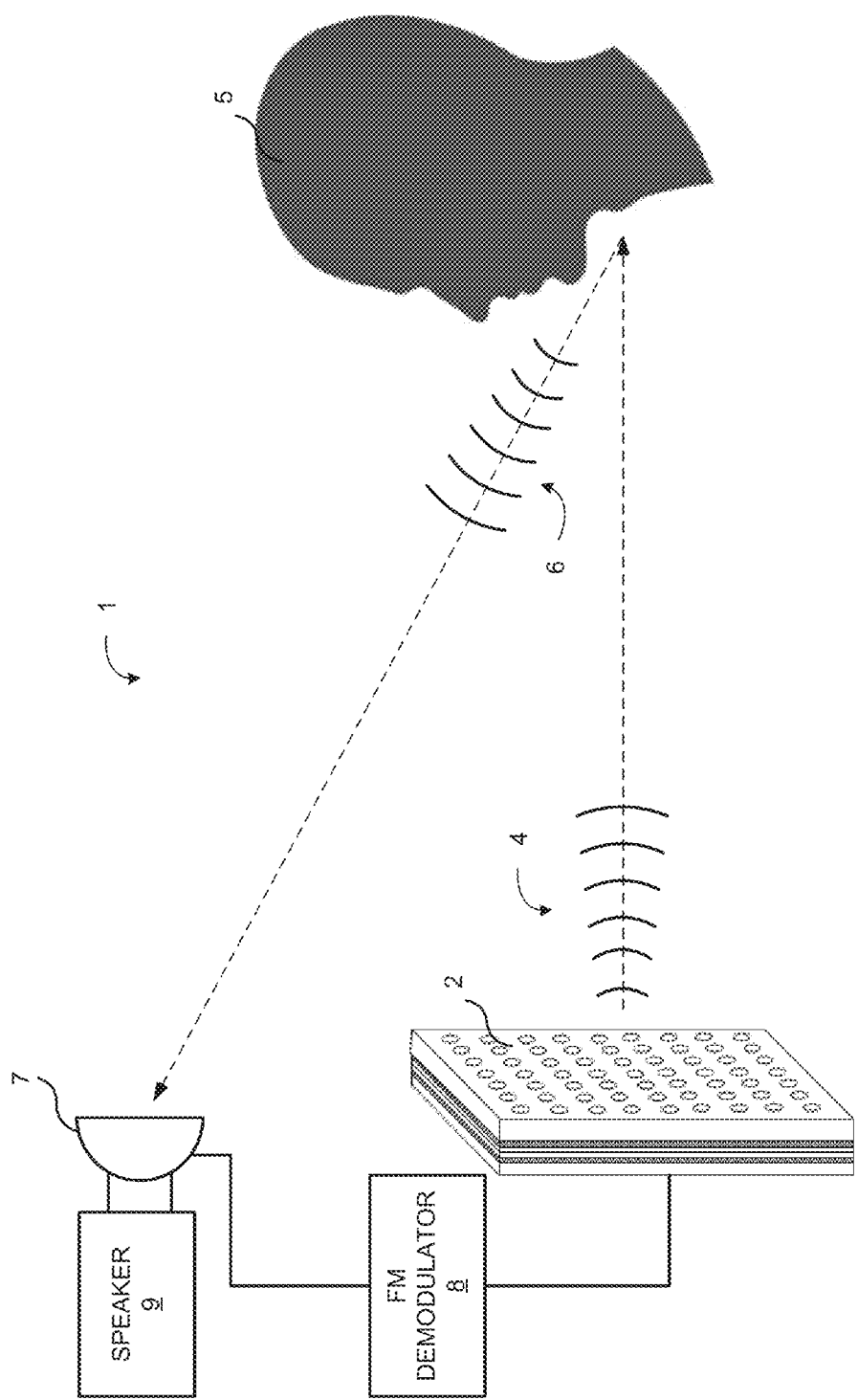
FIG. 3 is a diagram illustrating an example of frequency modulation occurring in accordance with one embodiment of the technology described herein.

It should be noted that FM demodulator 8 and microphone 7 need not be located at or proximate to emitter 2. That is, and in accordance with various embodiments, FM demodulator 8 and/or microphone 7 can be located at any position where FM modulated ultrasonic signal 6 is scattered. FIG. 3 illustrates another example of ultrasonic emitter microphone system 1, where microphone 7 is located away from emitter 2. Again, because microphone 7 can be tuned to the frequency of ultrasonic carrier signal 4, it can ignore other/ambient noise and pick up reflected FM ultrasonic signal 6 despite not being in a path of "direct" reflection from talker 5.

It should also be noted that although various embodiments are herein described in the context of picking up the vibrations of a speaker's vocal chords, any relative solid surface, the vibrations of which, are representative of some sound or audio signal can be picked up.

Figure 4:
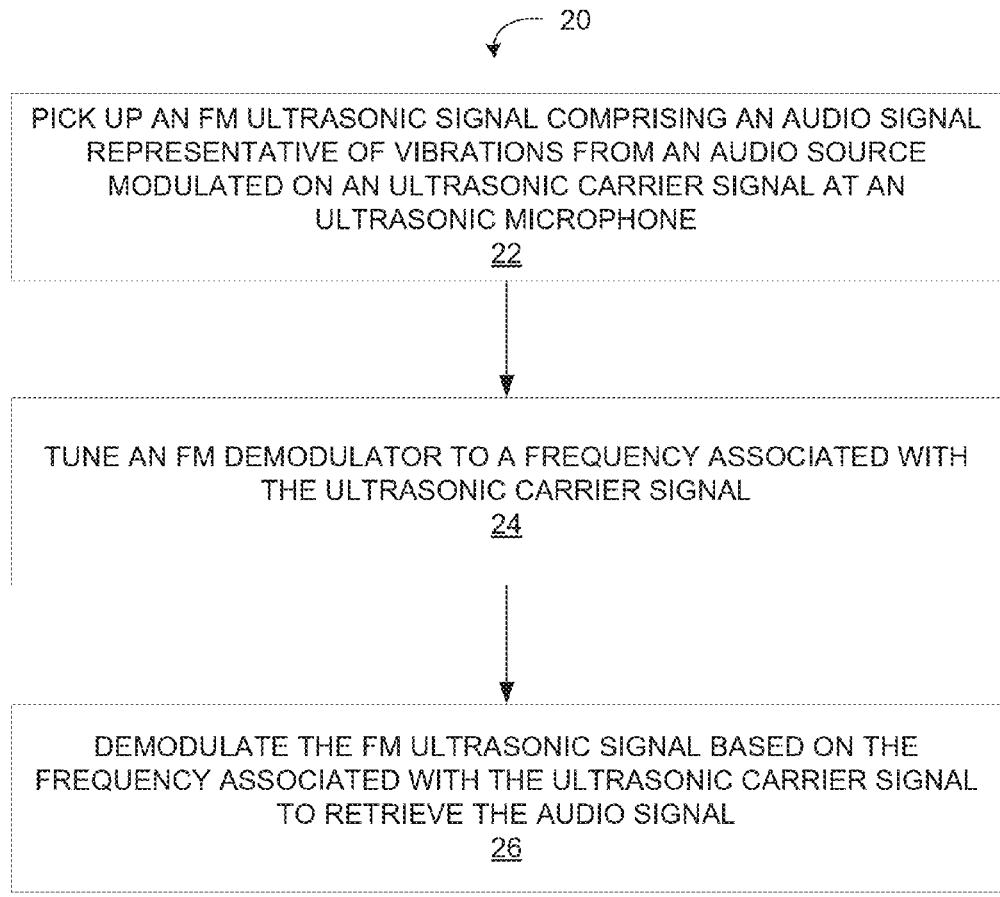
FIG. 4 is a flow chart of an example method for picking up and outputting an audio signal in accordance with one embodiment of the technology described herein.

FIG. 4 is a flow chart illustrating an example process performed in accordance with a method 20 for picking up sound in an ultrasonic emitter microphone system in accordance with one embodiment of the technology disclosed herein. At operation 22, an FM ultrasonic signal comprising an audio signal representative of vibrations from an audio source modulated on an ultrasonic carrier signal may be picked up at an ultrasonic microphone. The received signal comprises an audio signal representative of vibrations from an audio source modulated on the ultrasonic carrier signal. For example, an audio source may be a talker, and the vibrations are those generated by the vocal cords of the talker while the talker is speaking. As described previously, the vibrations of the vocal cords result in FM modulation of the ultrasonic carrier signal as it is reflected. As described above, the ultrasonic carrier signal can be that which is transmitted by an ultrasonic emitter.

At operation 24, an FM demodulator is tuned to a frequency associated with the ultrasonic carrier signal. It should be noted that the frequency to which the FM demodulator is tuned may include an offset. At operation 26, the FM modulated ultrasonic signal is demodulated based on the frequency associated with the ultrasonic carrier signal to retrieve the audio signal. Various FM demodulation schemes may be utilized in accordance with various embodiments, some examples of which have been described above.

Therefore, and in accordance with various embodiments, a highly directional ultrasonic emitter microphone system can be achieved by virtue of the existence of a reflected and modulated ultrasonic signal only when a speaker or other audio source is in the beam of the unmodulated ultrasonic signal. Advantageously, the reflected and modulated ultrasonic signal is highly selectable and can be picked out.

Moreover, and in contrast to conventional directional microphones, e.g., cardioid/hypercardioid or bidirectional microphones, that still require an audio source to be, e.g. in front of and/or behind the microphone itself, a microphone in the ultrasonic emitter microphone system described herein need not be positioned with any particular relation to the audio source. Rather, the emitter need only have a 'line of sight' path to the audio source. Additionally, and despite the directional nature of conventional directional microphones, ambient or 'side' noises can still be picked up. Due to the highly directional nature of ultrasonic emitters as described herein, and by virtue of picking up vibrations rather than sound waves, the need for active and/or passive noise cancellation techniques in various applications, such as telephonic headset microphones can be diminished or altogether negated. Further still, the ultrasonic emitter microphone system is insensitive to such ambient noise, masking noise/audio, and/or other sounds that do not emanate from the target audio source. For example, the ultrasonic emitter microphone system may be configured to be sensitive to ultrasound (i.e., reflected FM modulated ultrasonic signals) at or near the carrier frequency, e.g., 44 kHz, and yet insensitive to sound at, e.g., 20-200 kHz.

As can be appreciated, various embodiments may be utilized in a myriad of applications/scenarios. For example, the ultrasonic emitter microphone system may be implemented as a vital signs monitor. That is, the aforementioned ability to pick up vibrations, e.g., from a talker's vocal chords, can be leveraged to detect/determine respiratory rate, heart rate, pulse rate, etc. For example, pulse rate can be determined by aiming the ultrasonic emitter at a portion of a person's body where the person's pulse can be externally detected (i.e., vibrations representative of the pulse can be picked up) and can modulate an ultrasonic carrier signal. It should be noted that the pulse rate, heart rate, etc. need not be that of a person (human), but may be that of an animal or may be that of another being, such as in the case of measuring a fetal heart rate, for example. Such areas can include, for example, a finger, the chest, a portion of the neck exhibiting pulse vibrations from the carotid artery, etc. Moreover, other bodily measurements can be made, such as blood pressure, which is a measure of the force of blood against artery walls (which again, may be measured by aiming the ultrasonic emitter at, e.g., an area(s) of the body which exhibit vibrations due to the flow of blood. In particular, and rather than demodulating the resulting FM modulated ultrasonic signal to retrieve audio, the amplitude variations indicative of beats can be determined and correlated to pulse rate. Additionally, the amplitude variations can be measured and correlated to blood pressure.

Still other applications/scenarios in which the ultrasonic emitter microphone system described herein may be utilized include those in which non-contact vibration measurements of a surface are desired, and at a lower cost (versus the use of, e.g., laser vibrometers). For example, an ultrasonic emitter microphone system can be used for measuring the frequency response of conventional (e.g., voice coil) speakers, diagnosing hearing loss by measuring eardrum vibrations, detecting sound/voice from vibrations in solid objects such as windows, walls, etc. Still other embodiments can be utilized as a sensor, e.g., for sensing the presence/location of heating ventilation and cooling (HVAC) units in building structures. That is, and for example, an ultrasonic emitter launching an unmodulated ultrasonic carrier signal across can be swept across, e.g., a wall or other structural element. The receipt of reflected signals comprising an FM modulated ultrasonic signal (the vibrations emitted by an HVAC unit providing the modulation) can be interpreted to be indicative of the existence of the HVAC unit. Yet another application in which various embodiments of the technology described herein may be used is in the context of sensing low or even ultra low/sub-sonic frequencies, as may be the case in scenarios involving the sensing of vibration through the ground/earth. Moreover, the origin/direction of such vibrations can be determined.

As previously alluded to, the reflected and modulated ultrasonic signal is highly selectable and can be picked out, allowing the targeting of, e.g., individuals/talkers in a space. To that end, the ultrasonic emitter microphone system can be implemented in an covert reconnaissance/espionage context or an electronic gaming scenario. For example, and in the electronic gaming scenario context, the ultrasonic emitter microphone system may be integrated into, e.g., a sound bar, or other electronic gaming accessory. When aimed at a user/player of the electronic game, audio from the user can be picked up without any interference (due to its insensitivity to ambient sounds) from other sounds in the playing space, sounds from the electronic game itself, etc. Even if, for example, an unmodulated carrier signal(s) were to be transmitted, e.g., in an omnidirectional manner, because the vibrations of a speaker/user are not affected by other audio/noise, the ultrasonic emitter microphone system would still be capable of sensing a reflected FM ultrasonic signal. Furthermore, the picked up audio can be incorporated into the electronic game, e.g., the audio picked up by the ultrasonic emitter microphone system could be mixed with other audio. This would negate any need for headphone/throat microphones, where the user could speak with another player in an interactive electronic game, for example. Moreover, and as described above, biometric measurements associated with the user could also be translated and integrated into the electronic gameplay, e.g., as part of haptic feedback technology.

Figure 5:
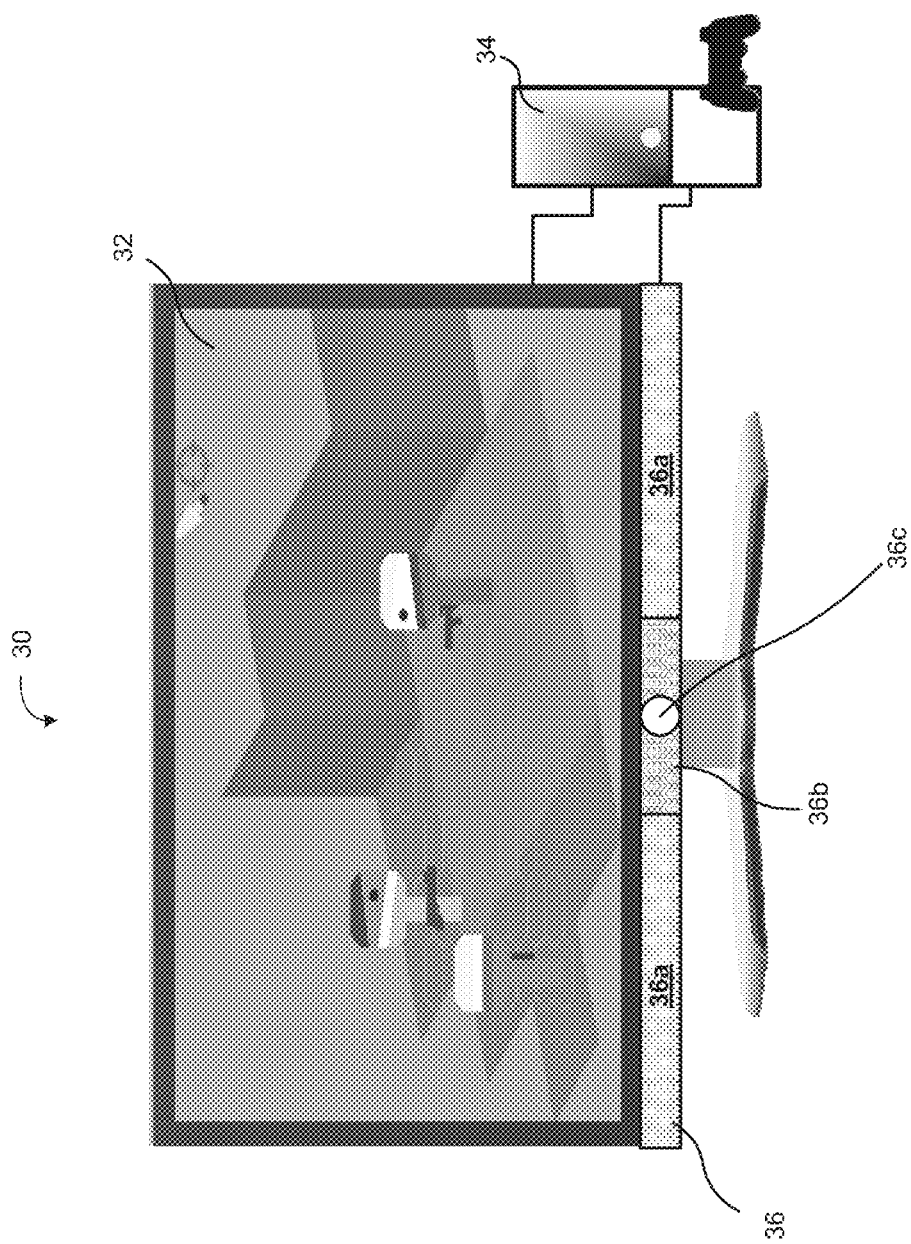
FIG. 5 is a diagram illustrating an example sound bar with which an ultrasonic emitter system can be implemented in accordance with one embodiment of the technology described herein.

FIG. 5 illustrates an example gaming system 30 in which an ultrasonic emitter microphone system in accordance with various embodiments may be implemented. Gaming system 30 may include a display or monitor 32 and a gaming console 34. Operatively connected to gaming console 34 is a sound bar 36. Sound bar 36 can include a conventional speaker portion 36*a*, an ultrasonic emitter portion 36*b*, an ultrasonic microphone 36*c*, and an FM demodulator (not shown). As described above, ultrasonic emitter portion 36*b* may emit a constant or periodic unmodulated ultrasonic carrier signal towards a user/player of gaming console 34. The reflection from, e.g., the throat of a user of gaming system 30, will be an FM ultrasonic signal as a result of the vibrations from the vocal chords of the user representative of the user's speech. Ultrasonic microphone 36*c* may pick up the reflected FM ultrasonic signal, and after demodulation by the FM demodulator, can be processed by gaming console 34 and output, e.g., back to the user via conventional speaker portion 36*a* and/or transmitted to other users in the event that gaming console 34 is communicatively connected to, e.g., a data network such as the Internet. Again, ultrasonic microphone 36*c* is unaffected by any other sound/noise that may be output by conventional speaker portion 36*a* of sound bar 36. That is, the user's voice can be isolated, picked up, and demodulated regardless of any other audio that may be present.

Other applications can include voice detection and/or isolation in any interactive/speaking context, such as in a conference call or videoconference setting, at a podium, etc. so that a speaker's voice can be isolated from any other speaker or ambient noise. For example, an ultrasonic emitter microphone system can be integrated into a speaker tracking system such that the ultrasonic emitter microphone system can be directed to a current speaker, allowing that current speaker's voice to be picked up and output to other conference participants. Still other applications include targeted voice detection for persons with hearing disabilities, where again, an ultrasonic emitter microphone system can be aimed towards a speaker whose voice that the hearing disabled person wishes to isolate and, e.g., amplify.

Figure 6:
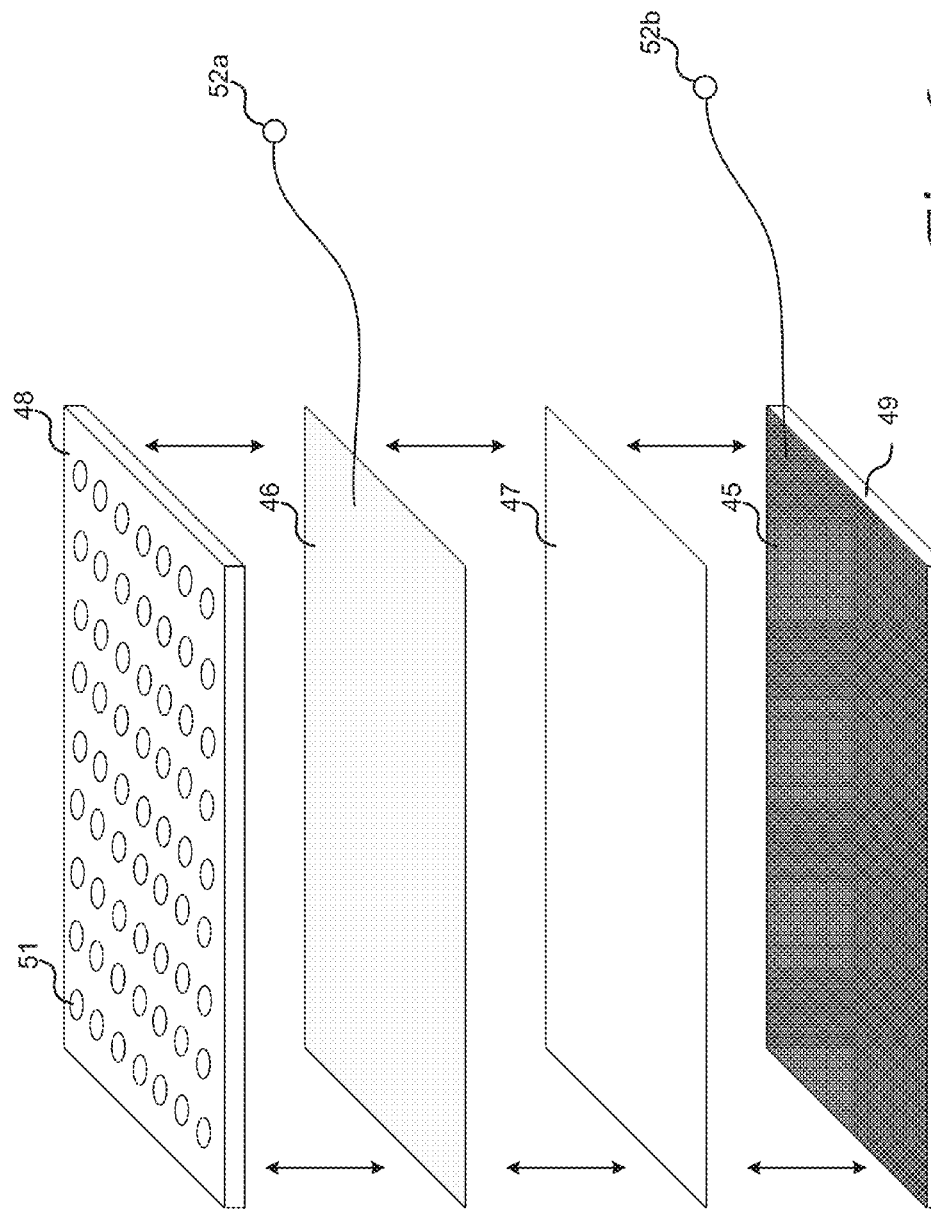
FIG. 6 is a blow-up diagram illustrating an example emitter in accordance with one embodiment of the technology described herein.

FIG. 6 is a blow-up diagram illustrating an example emitter in accordance with one embodiment of the technology described herein. The example emitter shown in FIG. 6 includes one conductive surface 45, another conductive surface 46, an insulating layer 47 and a grating 48. In the illustrated example, conductive layer 45 is disposed on a backing plate 49. In various embodiments, backing plate 49 is a non-conductive backing plate and serves to insulate conductive surface 45 on the back side. For example, conductive surface 45 and backing plate 49 can be implemented as a metalized layer deposited on a non-conductive, or relatively low conductivity, substrate.

As a further example, conductive surface 45 and backing plate 49 can be implemented as a printed circuit board (or other like material) with a metalized layer deposited thereon. As another example, conductive surface 45 can be laminated or sputtered onto backing plate 49, or applied to backing plate 49 using various deposition techniques, including vapor or evaporative deposition, and thermal spray, to name a few. As yet another example, conductive layer 45 can be a metalized film. In accordance with still another embodiment, backing plate 49 may be an injection molded backing plate. Further still, conductive layer 45 and 49 can be a singular element.

Conductive surface 45 can be a continuous surface or it can have slots, holes, cut-outs of various shapes, or other non-conductive areas. Additionally, conductive surface 45 can be a smooth or substantially smooth surface, or it can be rough or pitted. For example, conductive surface 45 can be embossed, stamped, sanded, sand blasted, formed with pits or irregularities in the surface, deposited with a desired degree of 'orange peel' or otherwise provided with texture.

Conductive surface 45 need not be disposed on a dedicated backing plate 49. Instead, in some embodiments, conductive surface 45 can be deposited onto a member that provides another function, such as a member that is part of a speaker housing. Conductive surface 45 can also be deposited directly onto a wall or other location where the emitter is to be mounted, and so on.

Conductive surface 46 provides another pole of the emitter. Conductive surface can be implemented as a metalized film, wherein a metalized layer is deposited onto a film substrate (not separately illustrated). The substrate can be, for example, polypropylene, polyimide, polyethylene terephthalate (PET), biaxially-oriented polyethylene terephthalate (e.g., Mylar, Melinex or Hostaphan), Kapton, or other substrate. In some embodiments, the substrate has low conductivity and, when positioned so that the substrate is between the conductive surfaces of layers 45 and 46, acts as an insulator between conductive surface 45 and conductive surface 46. In other embodiments, there is no non-conductive substrate, and conductive surface 46 is a sheet of conductive material. Graphene or other like conductive materials can be used for conductive surface 46, whether with or without a substrate.

In addition, in some embodiments conductive surface 46 (and its insulating substrate where included) is separated from conductive surface 45 by an insulating layer 47. Insulating layer 47 can be made, for example, using PET, axially or biaxially-oriented polyethylene terephthalate, polypropylene, polyimide, or other insulative film or material.

To drive the emitter with enough power to get sufficient ultrasonic pressure level, arcing can occur where the spacing between conductive surface 46 and conductive surface 45 is too thin. However, where the spacing is too thick, the emitter will not achieve resonance. In one embodiment, insulating layer 47 is a layer of about 0.92 mil in thickness. In some embodiments, insulating layer 47 is a layer from about 0.90 to about 1 mil in thickness. In further embodiments, insulating layer 47 is a layer from about 0.75 to about 1.2 mil in thickness. In still further embodiments, insulating layer 47 is as thin as about 0.33 or 0.25 mil in thickness. Other thicknesses can be used, and in some embodiments, a separate insulating layer 47 is not provided. For example, some embodiments rely on an insulating substrate of conductive layer 46 (e.g., as in the case of a metalized film) to provide insulation between conductive surfaces 45 and 46. One benefit of including an insulating layer 47 is that it can allow a greater level of bias voltage to be applied across the first and second conductive surfaces 45, 46 without arcing. When considering the insulative properties of the materials between the two conductive surfaces 45, 46, one should consider the insulative value of layer 47, if included, and the insulative value of the substrate, if any, on which conductive layer 46 is deposited.

A grating 48 can be included on top of the stack. Grating 48 can be made of a conductive or non-conductive material. In some embodiments, grating 48 can be the grating that forms the external speaker grating for the speaker. Because grating 48 is in contact in some embodiments with the conductive surface 46, grating 48 can be made using a non-conductive material to shield users from the bias voltage present on conductive surface 46. Grating 48 can include holes 51, slots or other openings. These openings can be uniform, or they can vary across the area, and they can be thru-openings extending from one surface of grating 48 to the other. Grating 48 can be of various thicknesses. For example, grating 48 can be approximately 60 mils, although other thicknesses can be used.

Electrical contacts 52a, 52b are used to couple the ultrasonic carrier signal into the emitter. An example of a driver circuit for the emitter is described below.

Figure 7:
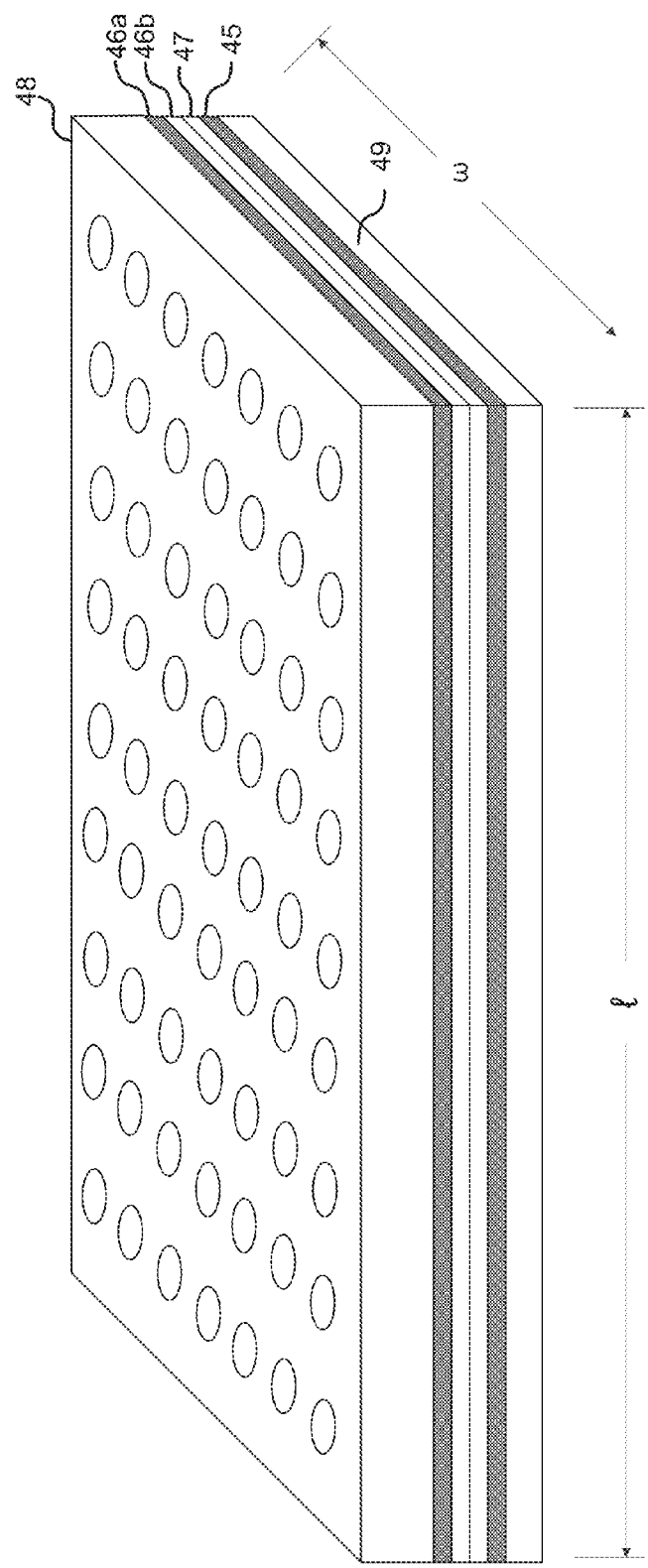
FIG. 7 is a diagram illustrating a cross sectional view of an assembled emitter in accordance with the example illustrated in FIG. 3.

FIG. 7 is a diagram illustrating a cross sectional view of an assembled emitter in accordance with the example illustrated in FIG. 6. As illustrated, this embodiment includes backing plate 49, conductive surface 45, conductive surface 46 (comprising a conductive surface 46a deposited on a substrate 46b), insulating layer 47 between conductive surface 45 and conductive surface 46a, and grating 48. The dimensions in these and other figures, and particularly the thicknesses of the layers, are not drawn to scale.

The emitter can be made to just about any dimension. In one application the emitter is of length, l, 10 inches and its width, $\omega$, is 5 inches although other dimensions, both larger and smaller are possible. Practical ranges of length and width can be similar lengths and widths of conventional bookshelf speakers. Greater emitter area can lead to a greater sound output.

Table 1 describes examples of metalized films that can be used to provide conductive surface 46. Low sheet resistance or low ohms/square is preferred for conductive surface 46.

Accordingly, films on table 1 having <5 and <1 Ohms/Square exhibited better performance than films with higher Ohms/Square resistance. Films exhibiting 2 k or greater Ohms/Square did not provide high output levels in development testing. Mylar and Kapton can be a desirable material because it is relatively temperature insensitive in temperature ranges expected for operation of the emitter. Polypropylene may be less desirable due to its relatively low capacitance. A lower capacitance in the emitter means a larger inductance (and hence a physically larger inductor) is needed to form a resonant circuit. As table 1 illustrates, films used to provide conductive surface 46 can range from about 0.25 mil to 3 mils, inclusive of the substrate.

TABLE 1

| Thickness | Material | Ohms/Sq |
|---|---|---|
| 3 mil | Mylar | 2000 |
| .8 mil | Polypropylene | 5 |
| 3 mil | Meta material | 2000+ |
| ¼ mil | Mylar | 2000+ |
| ¼ mil | Mylar | 2000+ |
| ¼ mil | Mylar | 2000+ |
| ¼ mil | Mylar | 2000+ |
| 3 mil | Mylar | 168 |
| .8 mil | Polypropylene | <10 |
| .92 mil | Mylar | 100 |
| 2 mil | Mylar | 160 |
| .8 mil | Polypropylene | 93 |
| 3 mil | Mylar | <1 |
| 1.67 | Polypropylene | 100 |
| .8 mil | Polypropylene | 43 |
| 3 mil | Mylar | <1 |
| 3 mil | Kapton | 49.5 |
| 3 mil | Mylar | <5 |
| 3 mil | Meta material | |
| 3 mil | Mylar | <5 |
| 3 mil | Mylar | <1 |
| 1 mil | Kapton | <1 |
| ¼ mil | Mylar | 5 |
| .92 mil | Mylar | 10 |

Although not shown in table 1, another film that can be used to provide conductive surface 46 is the DE 320 Aluminum/Polyimide film available from the Dunmore Corporation. This film is a polyimide-based product, aluminized on two sides. It is approximately 1 mil in thickness and provides <1 Ohms/Square. As these examples illustrate, any of a number of different metalized films can be provided as conductive surfaces 45, 46. Metalization is typically performed using sputtering or a physical vapor deposition process. Aluminum, nickel, chromium, copper or other conductive materials can be used as the metallic layer, keeping in mind the preference for low Ohms/Square material.

In other embodiments, materials such as graphene can be used as the conductive surfaces. For example, and in accordance with one embodiment, In accordance with one embodiment, conductive surface 45 can be graphene, and in accordance with another embodiment, conductive surface 46 can be graphene. In accordance with still other embodiments, both conductive surfaces 45 and 46 can be graphene. Graphene is an allotrope of carbon in which carbon atoms are bonded in a repetitive hexagonal pattern. Graphene comprises a one-atom thick layer of mineral graphite in which a plurality of layers may be stacked to create crystalline flake graphite. Graphene possesses superior heat and electrical conductive properties and is believed to be the strongest material known to man. The electron mobility of graphene is approximately 200 times greater than that of silicon. Graphene is very light and a single square meter sheet of graphene weighs approximately 0.77 milligrams. Graphene is flexible with superior elasticity and may be formed into different shapes. Graphene is also transparent and absorbs about 2.3% of incident visible light. Graphene as utilized in accordance with various embodiments described herein may be fabricated to be a suitable thickness to enable optimal resonation of sonic or ultrasonic signals.

Graphene films can be produced with the desired levels of conductivity (e.g., similar to the films described above), and can, in some cases be made as transparent films. Graphene films can be created by a number of techniques. In one example, graphene can be deposited by chemical vapor deposition onto sheets of copper foil (or other sacrificial layer). The graphene can then be coated with a thin layer of adhesive polymer sacrificial layer dissolved away. The graphene can be left on the polymer or pressed against another desired insulating substrate, such as Mylar or Kapton, and the polymer layer removed by heating. The graphene can be treated, for example, with nitric acid, to improve its electrical conductivity. It should be noted that as utilized herein, the term "graphene" can also refer to a graphene alloy, composite, hybrid, and/or other graphene-related material. For example, the graphene material utilized in various embodiments may be a "pure" graphene film described above, or may be an alloy such as a nitrogen-graphene alloy, a hybrid material comprising graphene in combination with a one dimensional nanomaterial, etc.

Figure 8:
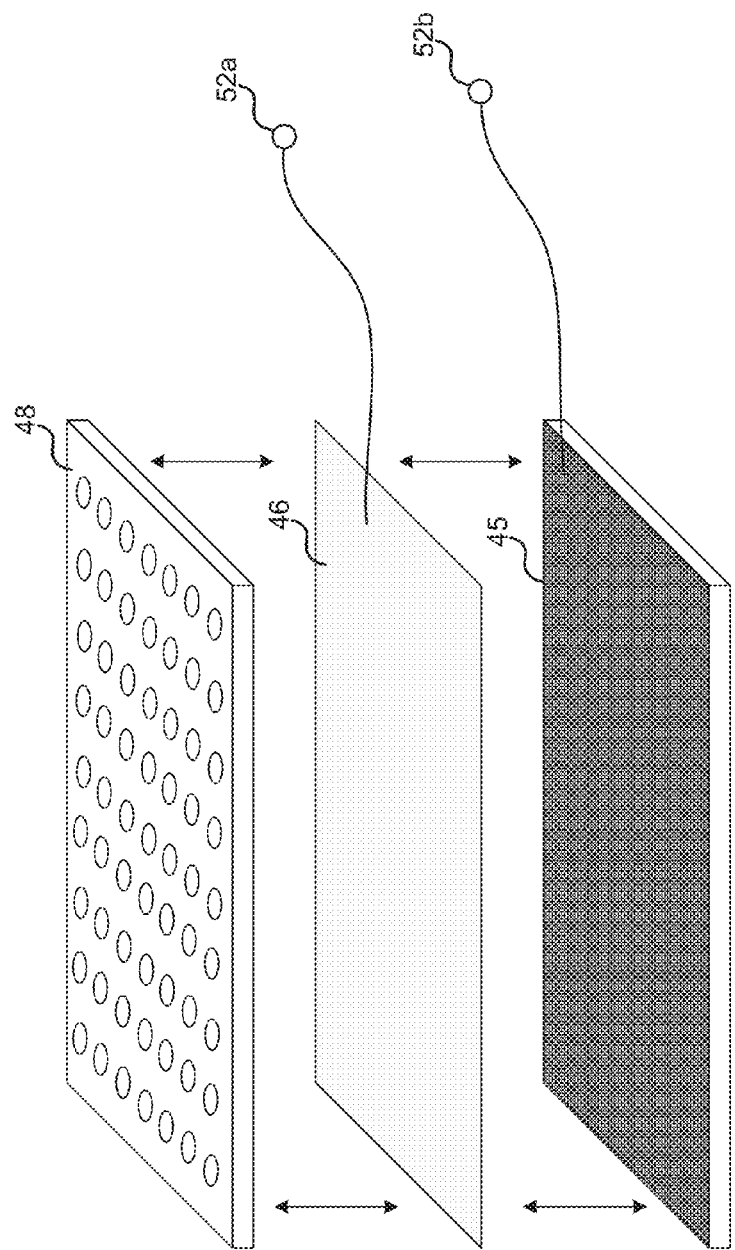
FIG. 8 is a diagram illustrating another example configuration of an ultrasonic emitter in accordance with one embodiment of the technology described herein.

FIG. 8 is a diagram illustrating another example configuration of an ultrasonic emitter in accordance with one embodiment of the technology described herein. The example in FIG. 8 includes conductive surfaces 45 and 46 and grating 48. The difference between the embodiment shown in FIG. 8, and that shown in FIGS. 6 and 7 is that the embodiment shown in FIG. 8 does not include separate insulating layer 47. Layers 45, 46 and 48 can be implemented using the same materials as described above with reference to FIGS. 6 and 7. Particularly, to avoid shorting or arcing between conductive surfaces 45, 46, conductive surface 46 is deposited on a substrate with insulative properties. For example, metalized Mylar or Kapton films like the films shown in Table 1 can be used to implement conductive surface 46, with the film oriented such that the insulating substrate is positioned between conductive surfaces 45, 46.

FIG. 9 illustrates yet another example configuration of an ultrasonic emitter in accordance with one embodiment of the technology described herein. The example in FIG. 9 excludes the use of a grating and utilizes Mylar as conductive surfaces 45 and 46. In particular, there can be a backing plate 49, layers 45 and 46, which may be conductive surfaces configured from Mylar, and layer 51 which may be a metal layer. The Mylar of layer 45 (adjacent backing plate 49) may be very thin (e.g., on the order of 3 microns) and serves to electrically isolate the metal layer 51 (which is attached to Mylar conductive layer 46) from the backing plate 49, without adding an appreciable amount of mass.

Figure 10B:
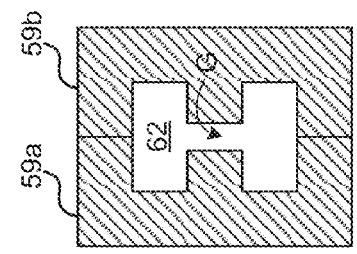
FIG. 10B is a diagram illustrating a cutaway view of an example of a pot core that can be used to form a pot-core inductor serving as the transductor to match the amplifier to the emitter.
Figure 10A:
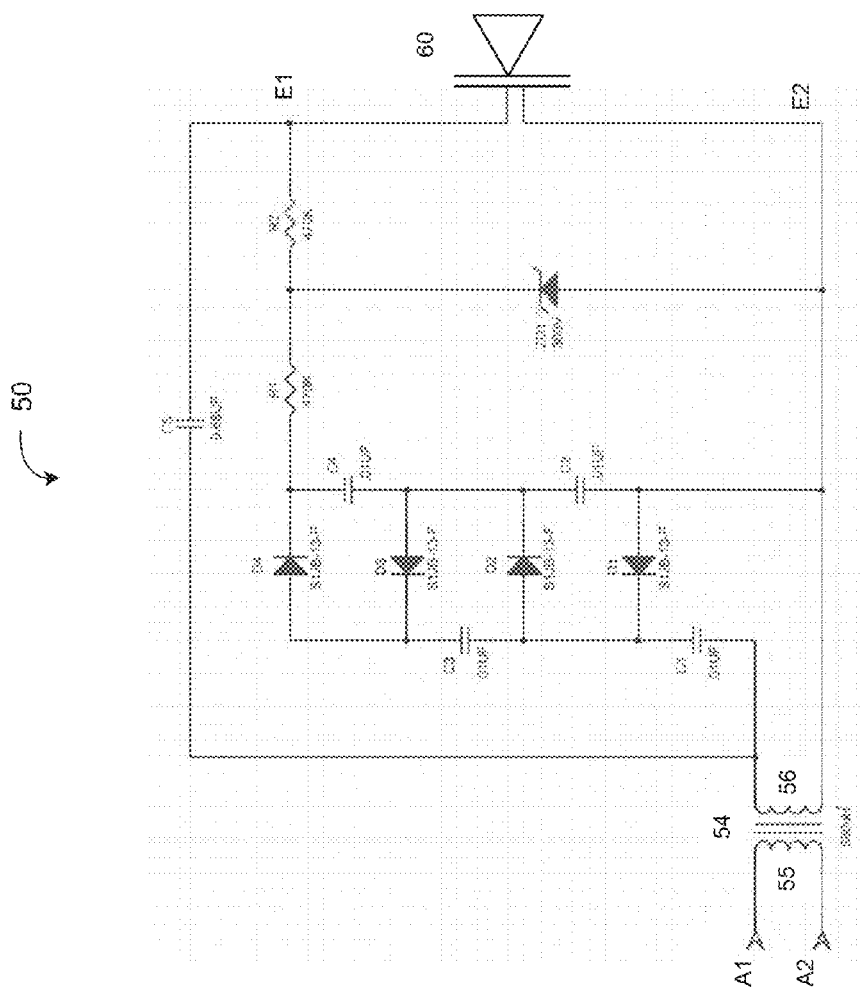
FIG. 10A is a diagram illustrating an example of a simple circuit to generate a bias voltage at the emitter drawing the necessary voltage from the output signal itself. In this example, the circuit is designed to bias at 300V but other voltages are possible by changing diode ZD1.

FIG. 10A is a diagram illustrating an example (self-bias) circuit to generate a D.C. bias voltage at an emitter drawing the necessary voltage from the output signal itself and to drive the emitter. As would be appreciated by one of ordinary skill in the art, where multiple emitters are used (e.g., for stereo applications), a driver/self-bias circuit 50 can be provided for each emitter. In some embodiments, the circuit 50 is provided in the same housing or assembly as the emitter. In other embodiments, the circuit 50 is provided in a separate housing. It should be noted that circuit 50 is only an example, and one of ordinary skill in the art will appreciate that other circuits can be used with the emitter technology described herein.

As described above, the unmodulated ultrasonic signal can be amplified using an amplifier that can be separate from, or a part of, and in the same housing or enclosure as circuit 50. After amplification, the carrier signal is delivered to inputs A1, A2 of circuit 50 (illustrated in FIG. 6A). In the embodiments described herein, the emitter assembly includes an emitter 60 that can be operable at ultrasonic frequencies. Emitter 60 is connected to circuit 50 by contacts E1, E2. A transducer 54 forms a parallel resonant circuit with the emitter. By configuring the transducer 54 in parallel with the emitter, the current circulates through the transducer 54 and emitter 60 to form a parallel resonant circuit. Accordingly, the capacitance of the emitter becomes important, because lower capacitance values of the emitter require a larger inductance to achieve resonance at a desired frequency. Accordingly, capacitance values of the layers, and of the emitter as a whole can be an important consideration in emitter design.

As alluded to above, circuit 50 not only acts as a driver circuit to drive an emitter, but also acts as a self-bias circuit to generate a bias voltage at the emitter drawing the necessary voltage from the signal itself. The amplifier can be part of, and in the same housing or enclosure as circuit 50. Alternatively, the amplifier can be separately housed. After amplification, the signal is delivered to inputs of circuit 50 used to drive the emitters disclosed herein. As would be appreciated by one of ordinary skill in the art, where multiple emitters are used (e.g., for stereo applications), circuit 50 can be provided for each emitter. In some embodiments, the circuit 50 is provided in the same housing or assembly as the emitter. In other embodiments, the circuit 50 is provided in a separate housing. This circuit is only an example, and one of ordinary skill in the art will appreciate that other driver circuits can be used with the emitter technology described herein or other appropriate bias circuit. In the embodiments described herein, the emitter assembly includes an emitter that can be operable at ultrasonic frequencies.

Emitter 60 is connected to driver circuit 50 by contacts E1 and E2, where a D.C. bias voltage is applied across E1, E2 to provide bias to emitter 60. Ideally, the bias voltage used is approximately twice (or greater than) the reverse bias that the emitter is expected to take on. This is to ensure that bias voltage is sufficient to pull the emitter out of a reverse bias state. In one embodiment, the bias voltage is on the order of 300-450 Volts, although voltages in other ranges can be used. For example, 350 Volts can be used. For ultrasonic emitters, bias voltages are typically in the range of a few hundred to several hundred volts.

A transducer 54 forms a parallel resonant circuit with the emitter. By configuring the transducer 54 in parallel with the emitter, the current circulates through the transducer 54 and emitter 60 and a parallel resonant circuit can be achieved. Accordingly, the capacitance of the emitter becomes important, because lower capacitance values of the emitter require a larger inductance to achieve resonance at a desired frequency. Accordingly, capacitance values of the layers, and of the emitter as a whole can be an important consideration in emitter design.

It should be noted that resonance can be achieved without the direct presence of the transducer in the circulating current path, resulting in more stable and predictable performance of the emitter, and significantly less power being wasted as compared to conventional series resonant circuits. Obtaining resonance at optimal system performance can greatly improve the efficiency of the system (that is, reduce the power consumed by the system) and greatly reduce the heat produced by the system.

Although series resonant arrangements can be used, arranging transducer 54 in parallel with the emitter 60 can provide advantages over series arrangement. This can result in more stable and predictable performance of the emitter, and less power being wasted as compared to series resonant configuration.

An advantage of the circuit 50 shown in FIG. 6A is that the bias can be generated from the ultrasonic carrier signal, and a separate bias supply is not required. In operation, diodes D1-D4 in combination with capacitors C1-C4 are configured to operate as a rectifier and voltage multiplier. Particularly, diodes D1-D4 and capacitors C1-C4 are configured as a rectifier and voltage quadrupler resulting in a DC bias voltage of up to approximately four times the carrier voltage amplitude across nodes E1, E2. Other levels of voltage multiplication can be provided using similar, known voltage multiplication techniques.

Capacitor C5 is chosen large enough to couple the modulated ultrasonic carrier signal to the emitter but present an open circuit to the DC voltage at E1 (i.e., to prevent the DC from shorting to ground). Resistors R1, R2 form a voltage divider, and in combination with Zener diode ZD1, limit the bias voltage to the desired level, which in the illustrated example is approximately 300 Volts. In particular, resistor R2 blocks the carrier passed by capacitor C5 (allowing it to pass to the emitter), while Zener diode ZD1 locks the voltage for setting the bias voltage at the desired level.

Transducer 54 can be of a variety of types known to those of ordinary skill in the art. However, transformers generate a magnetic field that can "radiate" beyond the confines of the device. This field can interfere with the operation and/or response of the emitter as well as other equipment in its vicinity. Additionally, it should be noted that many conventional transducer/emitter pairs used in ultrasonic sound applications operate at voltages that generate large amounts of thermal energy. Heat can negatively affect the performance of a parametric emitter. Therefore, and in accordance with various embodiments, due to the introduction of an air gap in the transducer and due to configuring the transducer 54 in parallel with the emitter in accordance with various embodiments (as described herein) saturation (and the creation of heat) can be avoided.

For at least these reasons, in most conventional parametric sound systems the inductor is physically located a considerable distance from the emitter. While this solution addresses the issues outlined above, it adds another complication. The signal carried from the inductor to the emitter is can be a relatively high voltage (on the order of 160 V peak-to-peak or higher). As such, the wiring connecting the inductor to the emitter must be rated for high voltage applications. Also, long runs of the wiring may be necessary in certain installations, which can be both expensive and dangerous, and can also interfere with communication systems not related to the parametric emitter system.

The transducer 54 (including as a component as shown in the configuration of FIG. 10A) can be implemented using a pot core inductor. A pot core inductor is housed within a pot core that is typically formed of a ferrite material. This confines the inductor windings and the magnetic field generated by the inductor. Typically, the pot core includes two ferrite halves 59a, 59b that define a cavity 62 within which the windings of the inductor can be disposed. See FIG. 10B. An air gap G can be included to increase the permeability of the pot core without affecting the shielding capability of the core. Thus, by increasing the size of the air gap G, the permeability of the pot core is increased. However, increasing the air gap G also requires an increase in the number of turns in the inductor(s) held within the pot core in order to achieve a desired amount of inductance. Thus, an air gap can increase permeability and at the same time reduce heat generated by the pot core inductor, without compromising the shielding properties of the core. It should be noted that the terms transformer and transductor may be used interchangeably in the context of the present disclosure. It should further be noted that various types of transformers/transductors may be utilized in accordance with various embodiments. Examples of transformers/transductors that can be utilized in and/or configured in accordance with various embodiments are disclosed in U.S. Pat. No. 8,391,514, which is incorporated herein by reference in its entirety.

In the example illustrated in FIG. 10A, a matching transductor 54 is used. However, the primary 55 and secondary 56 windings can be combined in what is commonly referred to as an autotransformer configuration.

As discussed above, it is desirable to achieve a parallel resonant circuit with the secondary winding 56 of transductor 54 and the emitter 60. It is also desirable to match the impedance of the primary winding 55 of the transductor/emitter pair 54/60 with the impedance expected by the amplifier.

An additional benefit of increasing the size of the air gap is that the physical size of the pot core can be reduced. Accordingly, a smaller pot core transformer can be used while still providing the same inductance to create resonance with the emitter.

The use of a matching transductor provides additional advantages for the present system. Because the transformer "steps-up" from the direction of the amplifier to the emitter, it necessarily "steps-down" from the direction of the emitter to the amplifier. Thus, any negative effects that might otherwise travel from the transductor/emitter pair to the amplifier is reduced by the step-down process, thus minimizing the effect of any such event on the amplifier and the system in general (in particular, changes in the transductor/emitter pair that might affect the impedance load experienced by the amplifier are reduced).

Although not shown in the figures, where the bias voltage is high enough, arcing can occur between conductive layers 45, 46 (FIG. 7). This arcing can occur through the intermediate insulating layers as well as at the edges of the emitter (around the outer edges of the insulating layers. Accordingly, the insulating layer 47 can be made larger in length and width than conductive surfaces 45, 46, to prevent edge arcing. Likewise, where conductive layer 46 is a metalized film on an insulating substrate, conductive layer 46 can be made larger in length and width than conductive layer 45, to increase the distance from the edges of conductive layer 46 to the edges of conductive layer 45.

Figure 11A:
FIG. 11A is a cross sectional view of a textural element of a backing plate in accordance with one embodiment of the technology described herein.
Figure 11B:
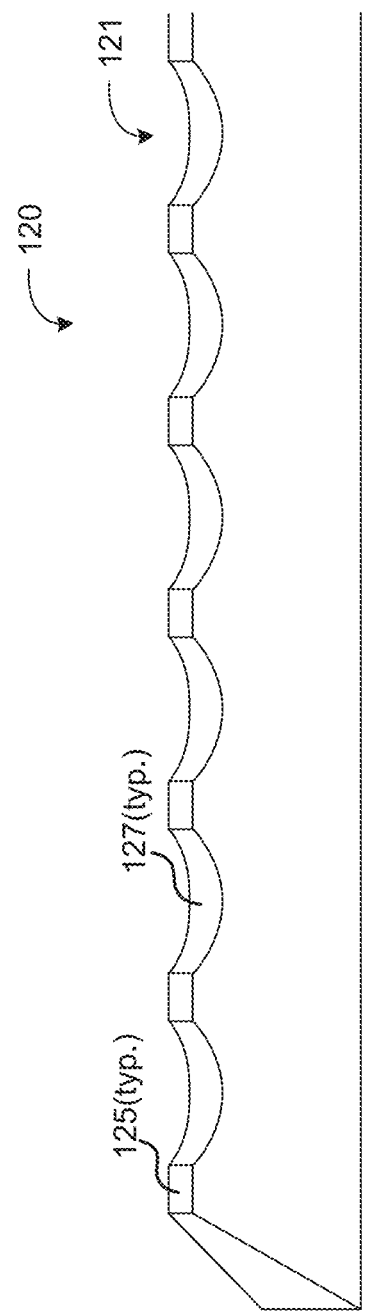
FIG. 11B presents a perspective view of the textural element of FIG. 10A.

FIGS. 11A and 11B, provide an example embodiment for the textural elements of the backing plate. FIG. 11A is a cross sectional view of a textural element in accordance with one embodiment of the technology described herein, while FIG. 11B presents a perspective view. Referring now to FIGS. 11A and 11B, in this example, a ridge 120 is provided with a modified scalloped top surface 121. Surface 121 includes a plurality of high points 125 and depressions 127 which provide a contour to the top of the textural element (e.g., ridge 120).

Also illustrated in FIG. 11A is a conductive layer 46 positioned above backing plate 104. Although conductive layer 46 is shown as spaced apart from the peaks of ridges 120, conductive layer 46 can rest on or come into contact with the peaks of ridged surface 120 provided that conductive layer 46 comprises an insulating layer 46b between conducting layer 46a and backing plate 104. Although not illustrated, when a bias voltage is applied across the emitter, conductive layer 46 will be drawn into more stable contact with scalloped top surface 121, causing layer 46 to contact the high points 125 and, with sufficient bias, be drawn down at least partially into the depressions 127 and valleys between the ridges. Preferably, the bias is not sufficiently strong to draw layer 46 into complete contact with the entirety of the surface of backing plate 104, as some air volume is desired to allow layer 46 to move in response to application of the audio modulated ultrasonic signal.

Figure 12:
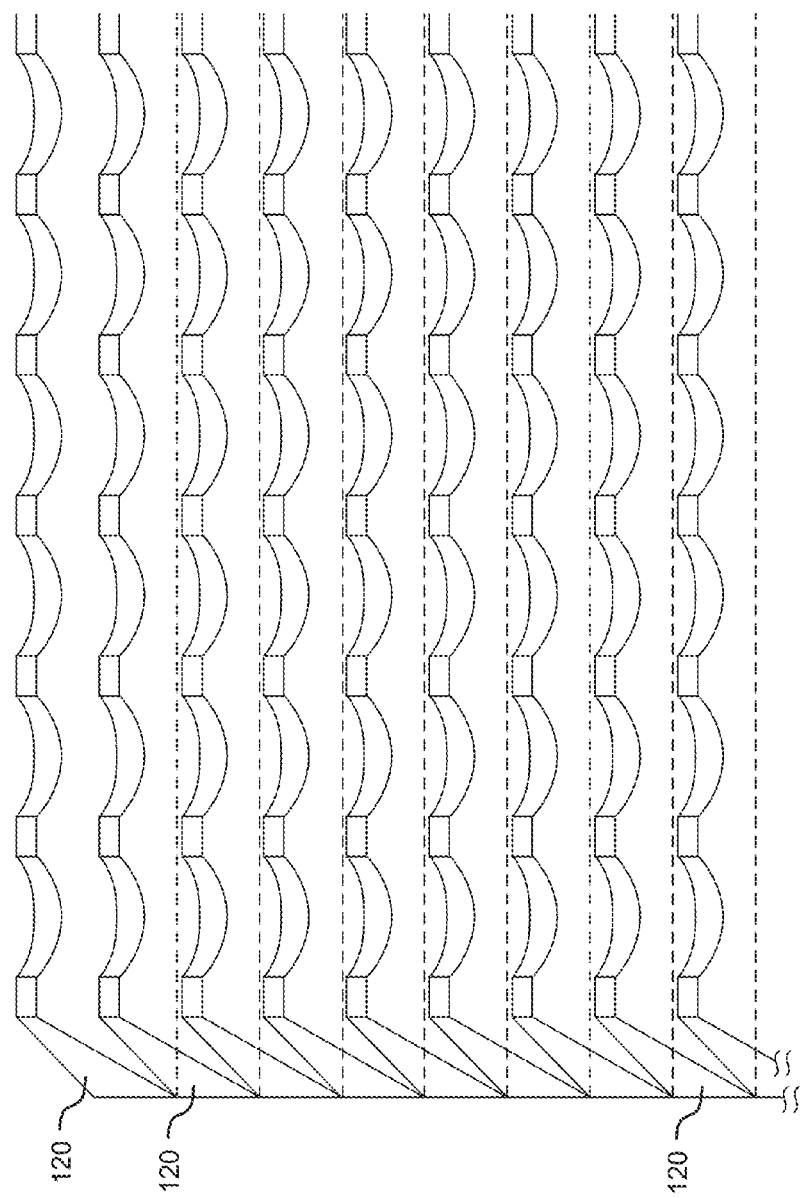
FIG. 12 is a diagram illustrating an example of a contour having a plurality of textural elements such as those illustrated in FIGS. 11A and 11B.

FIG. 12 is a diagram illustrating an example of a contour having a plurality of textural elements such as those illustrated in FIGS. 11A and 11B. In this example, the textural elements are arranged in the form of ridges positioned parallel to one another running across all or part of the backing plate 104. As shown in this example, the textural elements meet in a V at the base of each textural ridge. The angle of the V at the intersection formed between the sidewalls of adjacent pyramids is preferably a right angle, although other angles can be used.

In alternative embodiments, the textural elements do not meet in a V-shaped configuration in the valleys between the ridges. For example, in one alternative the surface between adjacent ridges 120 is a radius surface (e.g. a U-shaped configuration). As another example, in another alternative configuration, the surface between adjacent ridges 121 has a flat bottom or floor 123, in which the ridges 121 slope downward from their respective peaks (a constant slope in this example, although a curved surface can also be used) and meet at a substantially flat valley floor 123. The transition from ridge slope to valley floor can be sharp, or it can be radiused. The heights of the textural elements (e.g. ridges 120) can vary, but are preferably relatively small.

It should be noted that in accordance with still other embodiments, an emitter may be a transparent emitter. For example, an emitter may be configured to be sufficiently transparent such that it can be positioned on, in front, or in place of a display screen of a content playback or display device. Referring back to FIG. 5, a transparent emitter may be implemented on, in front, or in place of the display portion of monitor 32, rather than as part of sound bar 36. Some examples of transparent emitters which can be utilized in accordance with various embodiments are described in U.S. patent application Ser. No. 14/330,794, which is incorporated herein by reference in its entirety.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method, comprising:
   directing an ultrasonic carrier signal towards a person's neck;
   receiving, at an ultrasonic microphone, a frequency modulated ultrasonic signal comprising an audio signal made up of vibrations representative of the person's speech;
   wherein the frequency modulated ultrasonic signal is linearly modulated at the person's neck, the ultrasonic carrier signal being linearly modulated with vibrations occurring at the surface of the person's neck, the vibrations being caused by the person's vocal cords during speech, inducing a frequency shift in the ultrasonic carrier signal based on the vibrations as it is reflected off of the person's neck;
   tuning a demodulator to a frequency associated with the ultrasonic carrier signal; and
   demodulating the frequency modulated ultrasonic signal based on the frequency associated with the ultrasonic carrier to retrieve the audio signal.

2. The method of claim 1, wherein the frequency modulated ultrasonic signal is a reflection of the ultrasonic carrier signal reflected from the surface of the person's neck, the surface being skin of the person.

3. The method of claim 1, wherein the ultrasonic carrier signal is transmitted along a beam path substantially towards the audio source by an ultrasonic emitter.

4. The method of claim 3, wherein sound from one or more audio sources outside the transmission beam path of the ultrasonic carrier signal are omitted from the modulated ultrasonic signal.

5. The method of claim 3, wherein the ultrasonic microphone is positioned proximate to the ultrasonic emitter.

6. The method of claim 3, wherein the ultrasonic microphone is positioned behind an aperture in the ultrasonic emitter substantially in line with a reflected beam path that is parallel to the transmission beam path.

7. The method of claim 3, wherein the ultrasonic emitter periodically transmits the ultrasonic carrier signal, and wherein the ultrasonic emitter operates as the ultrasonic microphone by listening for the frequency modulated ultrasonic signal in between the periodic transmissions of the ultrasonic carrier signal.

8. The method of claim 1, further comprising outputting the retrieved audio signal to a plurality of non-ultrasonic loudspeakers.

9. The method of claim 7, wherein at least a first non-ultrasonic loudspeaker of the plurality of non-ultrasonic loudspeakers comprises a dynamic loudspeaker within which the ultrasonic microphone is operatively connected, and wherein the dynamic loudspeaker, the ultrasonic microphone, and an ultrasonic emitter from which the ultrasonic carrier signal is emitted comprise a gaming sound bar.

10. The method of claim 9, wherein at least a second non-ultrasonic loudspeaker of the plurality of non-ultrasonic loudspeakers comprises a dynamic loudspeaker remotely located from the first non-ultrasonic loudspeaker and operatively connected to the first non-ultrasonic loudspeaker via a networked gaming console.

11. A system, comprising:
    an ultrasonic emitter configured to emit an ultrasonic carrier signal;
    an ultrasonic microphone configured to receive a frequency modulated ultrasonic signal comprising an audio signal representative of vibrations occurring at the surface of the person's neck and linearly modulated at the person's neck, the ultrasonic carrier signal being linearly modulated with the vibrations being caused by the person's vocal cords during speech and representative of the person's speech, inducing a frequency shift in the ultrasonic carrier signal as it is reflected off of the person's neck; and
    a demodulator configured to demodulate the ultrasonic signal to retrieve the audio signal.

12. The system of claim 11, wherein the ultrasonic emitter comprises a flexible layer disposed adjacent a backing plate, the backing plate and the flexible layer each configured to be electrically coupled to a local oscillator generating the ultrasonic carrier signal, wherein upon application of the ultrasonic carrier signal, the flexible layer is configured to launch a pressure-wave representation of the ultrasonic carrier signal into the air.

13. The system of claim 11, wherein the ultrasonic emitter and the ultrasonic microphone are aimed substantially towards the person's neck.

14. The system of claim 11, wherein at least one of the ultrasonic microphone and the demodulator are co-located within or proximate to the ultrasonic emitter.

15. The system of claim 11, wherein the ultrasonic microphone is tuned to a frequency of the ultrasonic carrier signal.

16. The system of claim 11, further comprising at least one non-ultrasonic speaker, wherein the at least one non-ultrasonic speaker, the ultrasonic microphone, the ultrasonic emitter, and the demodulator comprise a sound bar operatively connected to a gaming console, the sound bar configured to capture only spoken audio by a user of the gaming console and emit audio generated by the gaming console and the retrieved audio signal, the retrieved audio signal representative of the spoken audio.

17. An apparatus, comprising:
   a tuner configured to tune to a frequency of an ultrasonic carrier signal;
   a demodulator configured to receive, from an ultrasonic microphone, a linearly frequency modulated ultrasonic signal comprising an audio signal representative of vibrations occurring at the surface of the person's neck, the vibrations being caused by a person's vocal cords during speech and representative of the person's speech, the linear frequency modulation occurring at the person's neck, wherein the vibrations induce a frequency shift in the ultrasonic carrier signal as it is reflected off of the person's neck; and
   an amplifier configured to amplify the vibrations.

18. The apparatus of claim 17, wherein the frequency modulated ultrasonic signal is a reflection of the ultrasonic carrier signal reflected from the surface of the person's neck, the surface being skin of the person.

19. The apparatus of claim 17, wherein the ultrasonic carrier signal is transmitted by an ultrasonic emitter directed towards the person's neck.

20. The apparatus of claim 17, wherein the ultrasonic microphone is a broadband microphone.

21. The apparatus of claim 17, wherein the demodulator and the ultrasonic microphone are co-located with the ultrasonic emitter.

22. The apparatus of claim 17, wherein the demodulator and the ultrasonic microphone are remotely located from the ultrasonic emitter.

* * * * *